(12) United States Patent
Ford et al.

(10) Patent No.: US 8,185,724 B2
(45) Date of Patent: May 22, 2012

(54) MONITORING VALUES OF SIGNALS WITHIN AN INTEGRATED CIRCUIT

(75) Inventors: Simon Andrew Ford, Cambridge (GB); Alastair Reid, Fulbourn (GB)

(73) Assignee: ARM Limited, Cambridge (GB)

( * ) Notice: Subject to any disclaimer, the term of this patent is extended or adjusted under 35 U.S.C. 154(b) by 444 days.

(21) Appl. No.: 12/224,671

(22) PCT Filed: Mar. 3, 2006

(86) PCT No.: PCT/GB2006/000754
§ 371 (c)(1),
(2), (4) Date: Sep. 3, 2008

(87) PCT Pub. No.: WO2007/099273
PCT Pub. Date: Sep. 7, 2007

(65) Prior Publication Data
US 2009/0043993 A1    Feb. 12, 2009

(51) Int. Cl.
*G06F 9/44* (2006.01)
*G06F 9/45* (2006.01)

(52) U.S. Cl. ............. 712/227; 717/128; 717/129

(58) Field of Classification Search .......... 712/227; 717/128, 129
See application file for complete search history.

(56) References Cited

U.S. PATENT DOCUMENTS

| | | | |
|---|---|---|---|
| 5,909,695 | A | 6/1999 | Wong et al. |
| 6,272,520 | B1 | 8/2001 | Sharangpani et al. |
| 6,282,614 | B1 | 8/2001 | Musoll |
| 6,338,123 | B2 | 1/2002 | Joseph et al. |
| 6,523,109 | B1 | 2/2003 | Meier |
| 6,704,845 | B2 | 3/2004 | Anderson et al. |
| 6,721,848 | B2 | 4/2004 | Gaither |
| 6,810,467 | B1 | 10/2004 | Khare et al. |
| 6,874,062 | B1 | 3/2005 | Goldberg |
| 6,907,520 | B2 | 6/2005 | Parady |
| 7,093,079 | B2 | 8/2006 | Quach et al. |

(Continued)

FOREIGN PATENT DOCUMENTS

| | | |
|---|---|---|
| EP | 0 992 912 | 4/2000 |
| JP | 1-201740 | 8/1989 |
| WO | 2005/017708 | 2/2005 |

OTHER PUBLICATIONS

International Search Report for PCT/GB2006/000754, mailed Nov. 7, 2006.
Written Opinion of the International Searching Authority for PCT/GB2006/000754, mailed Nov. 7, 2006.
International Preliminary Report on Patentability for PCT/GB2006/000754, dated May 16, 2008.

(Continued)

*Primary Examiner* — Daniel Pan
(74) *Attorney, Agent, or Firm* — Nixon & Vanderhye P.C.

(57) ABSTRACT

An integrated circuit, and method of reviewing values of one or more signals occurring within that integrated circuit, are provided. The integrated circuit comprises processing logic for executing a program, and monitoring logic for reviewing values of one or more signals occurring within the integrated circuit as a result of execution of the program. The monitoring logic stores configuration data, which can be software programmed in relation to the signals to be monitored. Further, the monitoring logic makes use of a Bloom filter which, for a value to be reviewed, performs a hash operation on that value in order to reference the configuration data to determine whether that value is either definitely not a value within the range or is potentially a value within the range of values. If the value is determined to be within the set of values, then a trigger signal is generated which can be used to trigger a further monitoring process.

22 Claims, 7 Drawing Sheets

U.S. PATENT DOCUMENTS

| | | | |
|---|---|---|---|
| 7,213,106 | B1 | 5/2007 | Koster et al. |
| 7,296,158 | B2 * | 11/2007 | Staddon et al. ............... 713/171 |
| 7,325,102 | B1 | 1/2008 | Cypher |
| 7,392,351 | B2 | 6/2008 | Blumrich et al. |
| 2002/0087765 | A1 | 7/2002 | Kumar et al. |
| 2003/0026268 | A1 * | 2/2003 | Navas ........................... 370/400 |
| 2003/0115485 | A1 * | 6/2003 | Milliken ....................... 713/201 |
| 2003/0208665 | A1 | 11/2003 | Peir et al. |
| 2004/0088376 | A1 * | 5/2004 | McCanne et al. ............. 709/219 |
| 2005/0060457 | A1 | 3/2005 | Olukotun |
| 2005/0149734 | A1 * | 7/2005 | Eronen et al. ................. 713/176 |
| 2006/0047912 | A1 | 3/2006 | Chinnakonda |
| 2006/0064695 | A1 | 3/2006 | Burns et al. |
| 2007/0186054 | A1 | 8/2007 | Kruckemyer et al. |

OTHER PUBLICATIONS

Dharmapurikar, S. et al., "Longest Prefix Matching Using Bloom Filters", Proceedings of the 2003 Conference on Applications, Technologies, Architectures, and Protocols for Computer Communications, pp. 201-212, (2003).

Zou, P. et al., "Accmon: Automatically Detecting Memory-related Bugs via Program Counter-based Invariants", Proceedings of 37th International Symposium on Microarchitecture, pp. 269-280, Dec. 4, 2004).

U.S. Appl. No. 11/709,279, filed Feb. 2, 2007, Ozer et al.

U.S. Appl. No. 11/990,394, filed Feb. 13, 2008, Ghosh et al.

U.S. Appl. No. 12/224,725, filed Sep. 4, 2008, Ford et al.

International Search Report for International Application PCT/GB2005/003531, mailed Aug. 29, 2006.

Written Opinion of the International Searching Authority for PCT/GB2005/003531, mailed Aug. 29, 2006.

International Preliminary Report on Patentability for PCT/GB2005/003531, mailed Oct. 12, 2007.

International Search Report for PCT/GB2006/000795, mailed Nov. 10, 2006.

Written Opinion of the International Searching Authority for PCT/GB2006/000795, mailed Nov. 10, 2006.

International Preliminary Report on Patentability for PCT/GB2006/000795, dated May 27, 2008.

G. Memik et al, "Just Say No: Benefits of Early Cache Miss Determination" Proceedings of the Ninth International Symposium on High-Performance Computer Architecture (HPCA-9'03), 2003.

J. Peir et al, "Bloom Filtering Cache Misses for Accurate Data Speculation and Prefetching" Proceedings of the Sixteenth International Conference of Supercomputing, 2002, pp. 189-198.

N. Mehta et al, "Fetch Halting on Critical Load Misses" Proceedings of the $22^{nd}$ International Conference on Computer Design, 2004.

A. Hasegawa et al, "SH3: High Code Density, Low Power" IEEE Micro, 1995, pp. 11-19.

R.E. Kessler et al, "The Alpha 21264 Microprocessor Architecture" IEEE Micro, 19(2):24-36, Apr. 1999.

G. Reinman et al, "Using a Serial Cache for Energy Efficient Instruction Fetching" Journal of Systems Architecture, 2004, pp. 1-21.

B. Calder et al, "Predictive Sequential Associative Cache" $2^{nd}$ International Symposium on High Performance Computer Architecture, HPCA '96, Feb. 1996.

K. Inoue, et al, "Way-Predicting Set-Associative Cache for High Performance and Low Energy Consumption" ISLPED, 1999.

M. Powell et al, "Reducing Set-Associative Cache Energy via Way-Prediction and Selective Direct-Mapping" Proceedings of the $34^{th}$ International Symposium in Microarchitecture (MICRO), 2001.

B. Batson et al, "Reactive-Associative Caches" Conference on Parallel Architectures and Compilation, PACT'01, 2001.

A. Ma et al, "Way Memoization to Reduce Fetch Energy in Instruction Caches" Workshop on Complexity Effective Design, Jul. 2001, pp. 1-8.

T. Ishihara et al, "A Way Memoization Technique for Reducing Power Consumption of Caches in Application Specific Integrated Processors" Proceedings of the Design, Automation and Test in Europe Conference and Exhibition (Date'05), 2005.

R. Min et al, "Location Cache: A Low-Power L2 Cache System" ISLPED'04, Aug. 2004.

D. Nicolaescu et al, "Reducing Power Consumption for High-Associativity Data Caches in Embedded Processors" DATE'03, 2003.

Y. Chang et al, "Sentry Tag: An Efficient Filter Scheme for Low Power Cache" Australian Computer Science Communications, 2002, pp. 135-140.

C. Zhang et al, "A Way-Halting Cache for Low-Energy High-Performance Systems" ISLPED'04, Aug. 2004, pp. 1-6.

Y. Chang et al, "Design and Analysis of Low-Power Cache Using Two-Level Filter Scheme" IEEE Transactions on Very Large Scale Integration (VLSI) Systems vol. 11, No. 4, Aug. 2003, pp. 568-580.

J. Park et al, "Power-Aware Deterministic Block Allocation for Low-Power Way-Selective Cache Structure" IEEE International Conference on Computer Design (ICCD'04), 2004.

D. Albonesi, "Selective Cache Ways: On-Demand Cache Resource Allocation" Journal of Instruction-Level Parallelism 2, May 2000, pp. 1-22.

B. Bloom, "Space/Time Trade-offs in Hash Coding With Allowable Errors" Communications of the ACM, vol. 13, No. 7, Jul. 1970, pp. 422-426.

A. Broder et al, "Network Applications of Bloom Filters: A Survey" $40^{th}$ Annual Allerton Conference on Communication, Control, and Computing, 2002, Internet Mathematics vol. 1, No. 4, pp. 485-509.

S. Rhea et al, "Probabilistic Location and Routing" IEEE INFOCOM'02, Jun. 2002, pp. 1-10.

S. Dharmapurikar et al, "Deep Packet Inspection Using Parallel Bloom Filters" IEEE Hot Interconnects 12, Stanford, CA, Aug. 2003, pp. 1-8.

A. Kumar et al, "Space-Code Bloom Filter for Efficient Per-Flow Traffic Measurement" Proc. IEEE INFOCOM, 2004.

F. Chang et al, "Approximate Caches for Packet Classification" IEEE INFOCOM'04, Mar. 2004.

S. Cohen et al, "Spectral Bloom Filters" Proceedings of the 2003 ACM SIGMOD International Conference on Management of Data, 2003, pp. 241-252.

S. Sethumadhavan et al, "Scalable Hardware Memory Disambiguation for High ILP Processors" Proceedings of the $36^{th}$ International Symposium on Microarchitecture (MICRO-36 2003), 2003.

A. Roth, "Store Vulnerability Window (SVW): Re-Execution Filtering for Enhanced Load Optimization" Proceedings of $32^{nd}$ International Symposium on Computer Architecture (ISCA-32), Jun. 2005, pp. 1-11.

H. Akkary et al, "Checkpoint Processing and Recovery: Towards Scalable Large Instruction Window Processors" Microprocessor Research Labs, Intel Corporation.

L. Fan et al, "Summary Cache: A Scalable Wide-Area Web Cache Sharing Protocol" IEEE/ACM Transactions on Networking, vol. 8, No. 3, Jun. 2000, pp. 281-293.

M. Corliss et al, "Low-Overhead Interactive Debugging via Dynamic Instrumentation with DISE" Proceedings of the $11^{th}$ Int'l Symposium on High-Performance Computer Architecture (HPCA-11 2005).

A. Moshovos et al, "JETTY: Filtering Snoops for Reduced Energy Consumpation in SMP Servers" Proceedings of the $7^{th}$ International Symposium on High-Performance Computer Architecture, (HPCA-7), Jan. 2001.

C. Saldanha et al, "Power Efficient Cache Coherence" Workshop on Memory Performance Issues in Conjunction with ISCA, Jun. 2001.

M. Ekman et al, "Evaluation of Snoop-Energy Reduction Techniques for Chip-Multiprocessors" Workshop on Duplicating, Deconstructing and Debunking, in Conjunction with ISCA, May 2002.

M. Ekman et al, "TLB and Snoop Energy-Reduction using Virtual Caches in Low-Power Chip-Multiprocessors" ISLPED '02, Aug. 2002.

A. Moshovos, "RegionScout: Exploiting Coarse Grain Sharing in Snoop-Based Coherence" Proceedings of the $32^{nd}$ Annual International Symposium on Computer Architecture, 2005.

Office Action mailed Apr. 19, 2011 in co-pending U.S. Appl. No. 11/990,394.

Office Action mailed Aug. 15, 2011 in co-pending U.S. Appl. No. 12/224,725.

Fan, L. et al., "Summary Cache: A Scalable Wide-Area Web Cache Sharing Protocol", 1998, SIGCOMM, pp. 254-265.

* cited by examiner

MONITORING VALUES OF SIGNALS WITHIN AN INTEGRATED CIRCUIT

This application is the U.S. national phase of International Application No. PCT/GB2006/000754, filed 3 Mar. 2006, the entire contents of each of which are hereby incorporated by reference.

TECHNICAL FIELD

The technology relates to techniques for monitoring values of signals within an integrated circuit, and in particular for monitoring values of one or more signals occurring within the integrated circuit as a result of execution of a program by processing logic within the integrated circuit.

BACKGROUND

Such signals to be monitored may be passed over buses coupling individual components within the integrated circuit, or alternatively may be signals occurring within individual components assuming monitoring logic can be given access to such signals. It may be desirable to monitor the values of these signals for a variety of purposes. For example, when performing debug operations, it is often useful to monitor values of certain signals in order to seek to detect potential bugs which can then be analysed by a debug tool. Often in such debug applications, it is desirable to detect when certain predetermined values of signals occur and on such occurrence of a predetermined value to halt execution of the program and pass over control to a debug tool.

Another situation where monitoring values of signals is useful is when employing trace mechanisms to trace certain activities of the integrated circuit. In such situations, the occurrence of certain predetermined values of one or more signals can be used to trigger the generation of trace elements for outputting within a trace stream providing an indication of certain activities of the integrated circuit that may be of interest for subsequent analysis.

Another example of an application where monitoring the values of one or more signals occurring within the integrated circuit may be beneficial, is in profiling applications, where for example the profiling tool may wish to assess the number of times a particular address is accessed, the number of times a particular data value is used, etc.

In accordance with a known technique for monitoring values of particular signals, one or more watchpoint registers are provided for specifying individual values or ranges of values of interest. Such watchpoint mechanisms then compare values of particular signals occurring at a predetermined place within the integrated circuit (for example occurring over a particular bus path) with the values or ranges specified in the one or more watchpoint registers, and in the event of a match, generate a trigger signal. When used in debug applications, this trigger signal may be used, for example, to halt execution of the program and pass over control to the debug application. When used in trace or profile applications, this trigger may be used, for example, to control generation of the appropriate output trace or profile information for routing to a trace analysis tool or profile tool.

The signals being monitored may take a variety of forms, and in one embodiment may identify data addresses and/or data values passing within the integrated circuit. In such instances, the watchpoint logic may for example be coupled to a bus over which a load store unit of a processor communicates with memory. As another example, the signals being monitored may identify instruction addresses, such as may be issued by a prefetch unit of a processor, and in such instances the watchpoint logic may be coupled to a bus over which the prefetch logic issues those instruction addresses. Sometimes, watchpoint logic used to monitor instruction addresses is referred to as breakpoint logic, but herein the term "watchpoint" will be used to collectively refer to either a watchpoint or a breakpoint.

Typical implementations of watchpoint mechanisms provide a number of watchpoint registers which can be programmed with particular addresses. Further, the values in two watchpoint registers can be combined to provide a watchpoint range. However, such implementations have significant limitations. In particular, in any hardware implementation, a certain predetermined limited number of watchpoint registers will be provided, and this in turn will limit the number of separate values that can be monitored. This constraint is something which then needs to be managed carefully by the user to try and make most effective use of the available hardware resource provided by the fixed number of watchpoint registers.

An alternative approach for monitoring values of particular signals has been to employ a memory management unit (MMU) associated with a particular processing logic to generate trigger signals when particular values are identified. In particular, the MMU has access to page tables identifying particular attributes associated with pages of memory. For a page of memory associated with a value of interest, for example referenced by a particular address, then the associated entry for that page in the page table can be defined such that when the MMU sees an access to any part of that page, it will generate an abort signal, which can be used as a trigger signal in a similar way to the earlier described trigger signals produced by watchpoint logic. Whilst this approach does provide some extra flexibility by allowing more values to be monitored than may be available using standard hardware watchpoint registers, it has the problem that it produces lots of false hits. In particular, an access to any value within a particular page of memory that includes a data value of interest will cause the abort signal to be generated and further processing will then be necessary by the abort handler to establish whether the abort occurred due to access to the particular value of interest, or instead occurred due to access to a different value within that page of memory. This significantly impacts processing speed (for example in some implementations it has been shown to slow processing speed down by a factor of 100-1000).

Another major limitation of using an MMU in this way is that it can only monitor data and instruction addresses produced by the CPU: it cannot monitor data values and it cannot monitor values produced elsewhere in the integrated circuit (e.g., by a DMA engine). Another major limitation of using an MMU in this way is that it can only be used for invasive debugging, tracing and profiling since the abort signal interrupts the CPU. Non-invasive techniques are generally more preferable, since they have the benefit of minimally perturbing the behaviour of the system so that bugs are not masked and trace and profile data accurately reflects how the system would behave when not being monitored.

Nevertheless, in some implementations, despite the significant impact on processing speed, and the inherent inflexibility of such an approach, such MMU-based mechanisms have been used to overcome the inherent limitations of standard hardware watchpoint register mechanisms.

As an alternative to the above-described hardware mechanisms for monitoring values of particular signals, a number of software approaches have also been developed. One such software approach involves the use of instrumentation to generate a modified version of program code for execution, such that the software when executing provides additional information as it runs. Such instrumentation may be static instrumentation performed at compile time, or may be dynamic instrumentation where a sequence of instructions are translated into a modified stream of instructions on the fly at run time. Such instrumentation can be used to add additional instructions to the instruction sequence to seek to detect the presence of particular values of interest and instigate any required additional processing. As an example, it may be desired to detect whenever a load operation loads data from a particular data address. By such an instrumentation approach, one or more additional instructions can be added following each load instruction to identify whether the address used by that load instruction is the address of interest, and if so to branch to a particular exception routine.

One such software instrumentation approach is described in the Article "Low-Overhead Interactive Debugging via Dynamic Instrumentation with DISE" by M Corliss et al, Proceedings of the $11^{th}$ International Symposium on High-Performance Computer Architecture (HPCA-11 2005). When describing such an instrumentation approach for watching multiple addresses, this article indicates that if the number of watched addresses is both large and sparse, the instrumentation software can set up a watched address bitmap similar to a Bloom filter in a static data region, with each store address being hashed into this bitmap. Bloom filters were named after Burton Bloom for his seminal paper entitled "Space/Time Trade-Offs in Hash Coding with Allowable Errors", Communications of the ACM, Volume 13, Issue 4, July 1970. The purpose was to build memory efficient database applications. In the above-described software instrumentation technique, the additional instructions added by the instrumentation will reference the bitmap, with zeros in the bitmap indicating definite negatives, and ones indicating only probable positives. It is noted that this may trigger some spurious calls to the debugger-generated function, but that these should be compensated for by the simplified address checking sequence.

Whilst such software instrumentation techniques can provide significant flexibility for monitoring values of particular signals, the techniques are relatively complex, due to the instrumentation required to modify the code being executed, and further the additional instructions added to identify particular values of interest adversely impact performance.

The Article "AccMon: Automatically Detecting Memory-Related Bugs via Program Counter-Based Invariants", by P Zhou et al, Proceedings of the $37^{th}$ International Symposium on Microarchitecture (MICRO-37 2004), describes a PC-based invariant detection tool that uses a combination of architectural, run-time system, and compiler support to catch hard-to-find memory-related bugs. In the paper, it is observed that, in most programs, a given variable is typically accessed by only a few instructions, and hence based on this observation the paper describes identifying the set of program counter (PC) values that normally access a given key variable, which may for example be a memory object. Then, the paper describes a check look-aside buffer (CLB) whose purpose is to seek to reduce overhead by filtering most valid accesses to monitored objects. Such valid accesses do not need to trigger the monitoring function. The CLB structure is similar to a cache, in that it contains a number of entries, and for each memory address, the CLB is accessed to see if there is a matching entry in the CLB. Rather than each entry in the CLB containing a list of the acceptable set of PC values, a Bloom filter vector is instead identified in the entry, and hence a hit in the CLB will identify a Bloom filter vector that is used to test whether the program counter of the instruction issuing that memory address falls within the acceptable set.

Using the PC value, the identified Bloom filter vector is accessed directly using predetermined bits of the PC value, and if any accessed bit in the Bloom filter vector is zero, it is determined that the PC value does not belong to the acceptable set of PC values for that memory address. Otherwise the element may belong to the set. If it is determined that a bit accessed in the Bloom filter vector is zero, and hence the PC value definitely does not belong to the set, then a trigger is issued to trigger the monitoring function. However, otherwise no trigger is produced and it is assumed that the PC value is acceptable. By the nature of the Bloom filter, the assumption that the PC value is acceptable is not definitive, and it is possible in fact that the PC value may not have been within the acceptable set. Nevertheless, in the specific implementation described in this article, the view is taken that the probability of false positives is sufficiently low that this does not prove a problem.

One problem with the approach described in the above article is that it will not identify all occurrences of values of interest, which in the case of that article are any PC values not within the acceptable set of PC values. Whilst this is considered acceptable having regard to the particular problem that that article is concerned with, it would not generally be considered an acceptable approach when seeking to adopt a more flexible alternative to the earlier described watchpoint mechanisms, where it will typically not be acceptable to allow any watchpoint to be missed. Another problem is that the CLB structure and the Bloom filters within it can only be used to monitor pairs of an instruction address and a data address. It cannot monitor just instruction addresses, data addresses, data values, or values outside of the CPU (e.g., generated by a DMA engine).

Accordingly, it would be desirable to develop an improved hardware technique for enabling watchpoint values to be reliably monitored, but without the inherent limitations associated with typical watchpoint register mechanisms.

SUMMARY

Viewed from a first aspect, an integrated circuit comprises: processing logic operable to execute a program; monitoring logic operable to review values of one or more signals occurring within the integrated circuit as a result of execution of said program, the monitoring logic comprising: a storage element for storing configuration data; an interface via which the configuration data is software programmable having regard to a set of values of said one or more signals to be monitored; and hash logic operable for a value to be reviewed to perform a hash operation on that value in order to reference the configuration data to determine whether that value is either definitely not a value within said set of values or is potentially a value within said set of values; the monitoring logic being operable to generate a trigger signal if it is determined that that value is potentially a value within said set of values, the trigger signal being used to trigger a further monitoring process.

Monitoring logic is provided which includes a storage element for storing configuration data, where the configuration data is software programmable having regard to a set of values to be monitored. For a value to be reviewed, hash logic then performs a hash operation in order to reference the configuration data to determine whether that value is either definitely not a value within the set of values or is potentially a value within the set of values. The monitoring logic is then arranged to generate a trigger signal if it is determined that the value is potentially a value within the set of values, with that trigger signal being used to trigger a further monitoring process. By such an approach, it can be ensured that all occurrences of the values of interest will cause the trigger signal to be issued by the monitoring logic, and hence the further monitoring process will be appraised of all such occurrences. Due to the fact that a hash operation is used to reference the configuration data, more than one value will typically result in the same reference to the configuration data, and accordingly the trigger signal may also be issued sometimes for values that actually are not within the set of interest. However, such "false hits" can be filtered out by the subsequent monitoring process if required.

A benefit is that the technology described provides a quick mechanism for performing the majority of the overhead in detecting the occurrence of values within a set of values of interest, with any values that are within that set always being detected. Whilst the mechanism will give a certain degree of false hits, this is generally much more acceptable than a mechanism that misses detection of any of the desired values. Further, the approach described would generally produce a relatively low number of false hits, compared for example with the earlier-described MMU approach, where due to the coarse granularity resulting from aborting on accesses to entire memory pages where those memory pages were referenced by one or more data addresses of interest, a very high degree of false hits occurs.

The level of false hits can be managed through appropriate selection of the size of the storage element, the way the configuration data is accessed and the number of values in the set to be monitored. Typically, for a specific size of storage element, and hence configuration data, the more values there are to be monitored, the more there is a likelihood of a false hit. For any particular implementation, since the configuration data is software programmable, this trade-off between number of values monitored and false hits is within the control of the user.

The further monitoring process triggered by the trigger signal may take a variety of forms. However, in one embodiment, the trigger signal is used to trigger as at least part of that further monitoring process a checking operation to determine whether the value causing the trigger signal to be generated is a value within said set of values. Depending on the reason why the values are being monitored, this will typically determine whether the checking operation is required, and whether that checking operation is required prior to performing any other monitoring process steps. For example, when debugging an application, it may be appropriate to perform the checking operation before initiating any debug operation, given the time penalty incurred when performing such a debug operation. As another example, if tracing the activities of the integrated circuit, it may be more appropriate to generate the appropriate trace elements for output in a trace stream prior to performing any such checking operation since that checking operation is not time critical. Indeed, in some instances, it may even be decided that such a checking operation is not required, since a false hit produced by the monitoring logic will merely result in some information being traced which is not of interest.

The monitoring logic can take a variety of forms. However, in one embodiment, the monitoring logic implements a Bloom filter operation, the configuration data in the storage element comprises a Bloom filter saturating counter vector, and the hash logic is operable from the value to be reviewed to generate at least one index, each index identifying a saturating counter in the Bloom filter saturating counter vector, and wherein the monitoring logic is operable to generate the trigger signal if each saturating counter identified by the at least one index contains a non-zero value. Such a Bloom filter design has been found to provide a particularly efficient implementation for the monitoring logic.

The saturating counters can be arranged in a variety of ways. Typically, when programming the Bloom filter saturating counter vector, each value in the set of values to be monitored will be passed through a hash function implementing the same hash operation as will be later applied by the hash logic of the monitoring logic, and each time a particular saturating counter is identified, then its value will be incremented (provided the counter is not already at the saturating limit). As an example, if each saturating counter can hold values from 0 to 3, then a value of 1 will indicate that one of the values in the set produced an index to that counter, a value of 2 will indicate that two values in the set produced an index to that counter, and a value of 3 will indicate that three or more values in the set produced an index to that counter.

Whilst in some embodiments the count value stored in each saturating counter can be useful, for example when the monitoring logic is itself able to alter the vector based on add or remove commands issued by software to the monitoring logic interface, it is not in other embodiments necessary to actually keep a count value for each entry in the vector. Accordingly, in one embodiment, the Bloom filter saturating counter vector is a Bloom filter bit vector, such that each saturating counter comprises a single bit. In such instances, the monitoring logic will generate the trigger signal if each saturating counter identified by the at least one index is set. In this bit vector example, such a set state may typically be indicated by a logic one value stored in a saturating counter, but in an alternative embodiment such a set state could be indicated by a logic zero value.

In one embodiment, the set of values to be monitored are discrete values. However, in another embodiment, the set of values to be monitored specify at least one range of values. In this latter case, the monitoring logic of one embodiment comprises: a plurality of said storage elements, each associated with a particular bit prefix length (also referred to herein as a prefix length) and operable to store configuration data for reference based on a prefix value having that particular prefix length; prefix extraction logic operable for a value to be reviewed to extract a plurality of prefix values, each prefix value being of a prefix length appropriate for referencing one of said plurality of storage elements; the hash logic being operable, for each prefix value, to perform an associated hash operation in order to reference the configuration data in the corresponding storage element to cause an output signal to be produced from that storage element; combination logic operable based on the output signals received from each storage element to determine whether the value to be reviewed is either definitely not within said at least one range of values, or is potentially a value within said at least one range of values; the monitoring logic being operable to generate said trigger signal if it is determined that that value is potentially a value within said at least one range of values.

Hence, in accordance with such embodiments, a plurality of storage elements can be programmed with configuration data appropriate to define one or more ranges of interest, and for any particular value to be reviewed, a plurality of prefix values can be extracted to enable each of the storage elements to be referenced. The combined outputs from each of the storage elements can then be used to determine whether the value is either definitely not within the range, or is potentially within the range. This provides a very efficient mechanism for enabling ranges of values to be monitored by the monitoring logic, thereby further improving flexibility whilst still retaining a quick mechanism for performing the majority of the overhead in detecting the occurrence of values within the set of values of interest.

The particular prefix lengths associated with the plurality of storage elements may be predetermined. However, in one embodiment, the particular prefix lengths with which the storage elements are associated are software programmable.

The configuration data can be defined in a variety of ways. In one embodiment, if software having knowledge of the hash operation performed by the hash logic alters the set of values to be monitored, the interface is operable to receive replacement configuration data to be stored in the storage element. Hence, in such embodiments, the monitoring logic merely replaces its configuration data with the new configuration data received via the interface.

However, in an alternative embodiment, if software alters the set of values, the interface is operable to receive an indication of the alteration to the set of values, the monitoring logic further comprising configuration data generating logic operable to generate replacement configuration data to be stored in the storage element. Such embodiments would be appropriate, for example, where the software does not have knowledge of the exact hash operation performed by the hash logic, and accordingly cannot directly produce the configuration data. In such instances, the indications received at the interface may identify that a particular value has been added to the set of values. For each such value received at the interface, the configuration data generating logic is operable to generate replacement configuration data. Typically, this may be performed by applying the hash operation to the new value supplied in order to produce an indication of the appropriate update to the configuration data, and then to apply that update to the existing configuration data. Taking the example of a Bloom filter saturating counter vector, this would hence involve incrementing the relevant saturating counter or saturating counters.

In addition, the indications received at the interface from the software may identify that the current configuration data should be reset, and optionally may also specify when values need to be removed from the set of values to be monitored, again such a removal requiring an update to the configuration data.

In one embodiment, the trigger signal is generated as soon as the monitoring logic determines that the value to be reviewed is potentially a value within the set of values. However, in one embodiment, if the monitoring logic determines that that value to be reviewed is potentially a value within said set of values, the monitoring logic is operable to defer generation of said trigger signal until a predetermined event occurs. Hence, the monitoring logic can in some embodiments be arranged to review values "ahead of time" such that by the time those values are observed at a particular place within the integrated circuit, the evaluation required by the monitoring logic has already been performed. An example of such a situation may be where the monitoring logic reviews instruction addresses issued by a prefetch unit to memory. These prefetched instructions are then typically stored in a buffer, from where they may later be routed to an execution unit of the processing logic for execution. It will typically not be appropriate to generate the trigger signal until the relevant instruction is executed. However, by performing the monitoring function earlier, the results of that monitoring operation are available without delay when the instruction is later executed (this being the "predetermined event" in this example).

The monitoring logic of embodiments may be used in a variety of applications. In one embodiment, the monitoring logic is associated with debug logic, and the trigger signal is used to trigger as at least part of said further monitoring process a debug operation if said checking operation determines that the value causing the trigger signal to be generated is a value within said set of values. In such embodiments, the checking operation used to determine whether the value causing the trigger signal to be generated is actually a value within the set of values is performed prior to initiating the debug operation, thereby avoiding any unnecessary triggering of the debug operation. As an example, this checking operation could be performed in software.

In an alternative embodiment, the monitoring logic is associated with trace logic used to produce a stream of trace elements indicating activities of the integrated circuit, and the trigger signal is used to trigger as at least part of said further monitoring process a trace generation process to generate one or more trace elements to be included in said stream. Hence, by way of example, the monitoring logic may determine that an address value is potentially a value within a set of address values of interest, with the trigger signal being used to cause the relevant trace elements to be generated for inclusion in the trace stream.

In an alternative embodiment, the monitoring logic is associated with profiling logic used to profile behaviour of the integrated circuit, and the trigger signal is used to trigger as at least part of said further monitoring process a profiling process to update profiling information based on the trigger signal. Hence, by way of example, the monitoring logic may identify that a particular address value of interest is potentially being accessed, and as a result trigger a profiling process to update the relevant profiling information, for example a count of the number of times that address is being accessed. It may in such embodiments be appropriate to perform the checking operation to determine whether the value causing the trigger signal to be generated is actually a value within the set of values of interest before updating the profiling information.

The monitoring logic can be located at a variety of positions within the integrated circuit. Hence, for example it may be linked to a particular path between components of an integrated circuit, for example a data address path between a CPU and its associated data cache, an instruction address path between a particular CPU and its instruction cache, a data value path between a data cache and a CPU, etc. Additionally, the monitoring logic may be used to monitor signals passing over a general system bus interconnecting a variety of components. Accordingly, the signals whose values are reviewed can take a variety of forms, but in one embodiment those signals comprise at least one of signals representing instructions or data, signals representing addresses of instructions or data, or signals providing out of band data on a bus (which might, for example, identify the transaction initiator). Alternatively, or in addition, other signals may be monitored, for example signals representing register numbers, interrupt identifiers, input/output (I/O), contents and headers of data and control packets (e.g. used in a Network on Chip (NoC)), etc.

In one embodiment, the processing logic is operable when executing the program to run a plurality of processes, and each value reviewed by the monitoring logic includes a process identifier indicating the process with which the value is associated. In such instances, the set of values to be monitored would typically also include a relevant process identifier, such that the monitoring logic is seeking not only to identify the occurrence of a particular value, but instead is seeking to identify the occurrence of a particular value issued in connection with a particular process. The actual "value" reviewed by the monitoring logic is in such situations the basic value combined with the associated process identifier, for example a data address and its associated process identifier, a data value and its associated process identifier, etc. This provides significant flexibility, since the monitoring logic in such embodiments is not only programmable to monitor any desired number of values, but can also be arranged to monitor the occurrence of specific values in association with specific processes, for example monitoring a master ID signal output on a bus.

In one embodiment the monitoring logic is further operable to reference trigger generation criteria, such that the monitoring logic is operable to generate the trigger signal if it is determined that the value is potentially a value within said set of values and the trigger generation criteria is met. Hence, trigger generation criteria can be set to qualify generation of the trigger signal if desired, such that the trigger signal is only generated if some other condition is true or some other condition is false. As an example, the trigger generation criteria may define that the trigger signal should only be generated if the current instruction is a branch instruction, and the monitoring logic tests whether the branch target address is potentially within a set of addresses of interest.

In one embodiment the values reviewed by the monitoring logic are the original values of signals produced within the integrated circuit, but in an alternative embodiment the values reviewed may be some modified or filtered variant of the original values.

Viewed from a second aspect, a data processing system comprises an integrated circuit in accordance with the first aspect, and analysis logic operable to perform the further monitoring process.

In one embodiment, the analysis logic is operable to perform as at least part of the further monitoring process a checking operation to determine whether the value causing the trigger signal to be generated is a value within the set of values. The analysis logic can take a variety of forms, for example debug logic, trace logic, profiling logic, etc.

In an example where the analysis logic comprises trace logic, the trace generation process may be performed prior to the checking operation. Further, in one such embodiment, the trace logic is provided within the integrated circuit.

Viewed from a third aspect, a method of reviewing values of one or more signals occurring within an integrated circuit as a result of execution of a program by processing logic of that integrated circuit comprises: storing configuration data in a storage element, the configuration data being software programmable having regard to a set of values of said one or more signals to be monitored; for a value to be reviewed, performing a hash operation on that value in order to reference the configuration data to determine whether that value is either definitely not a value within said set of values or is potentially a value within said set of values; and using a trigger signal to trigger a further monitoring process if it is determined that that value is potentially a value within said set of values.

DESCRIPTION OF NON-LIMITING, EXAMPLE EMBODIMENTS

Figure 1:
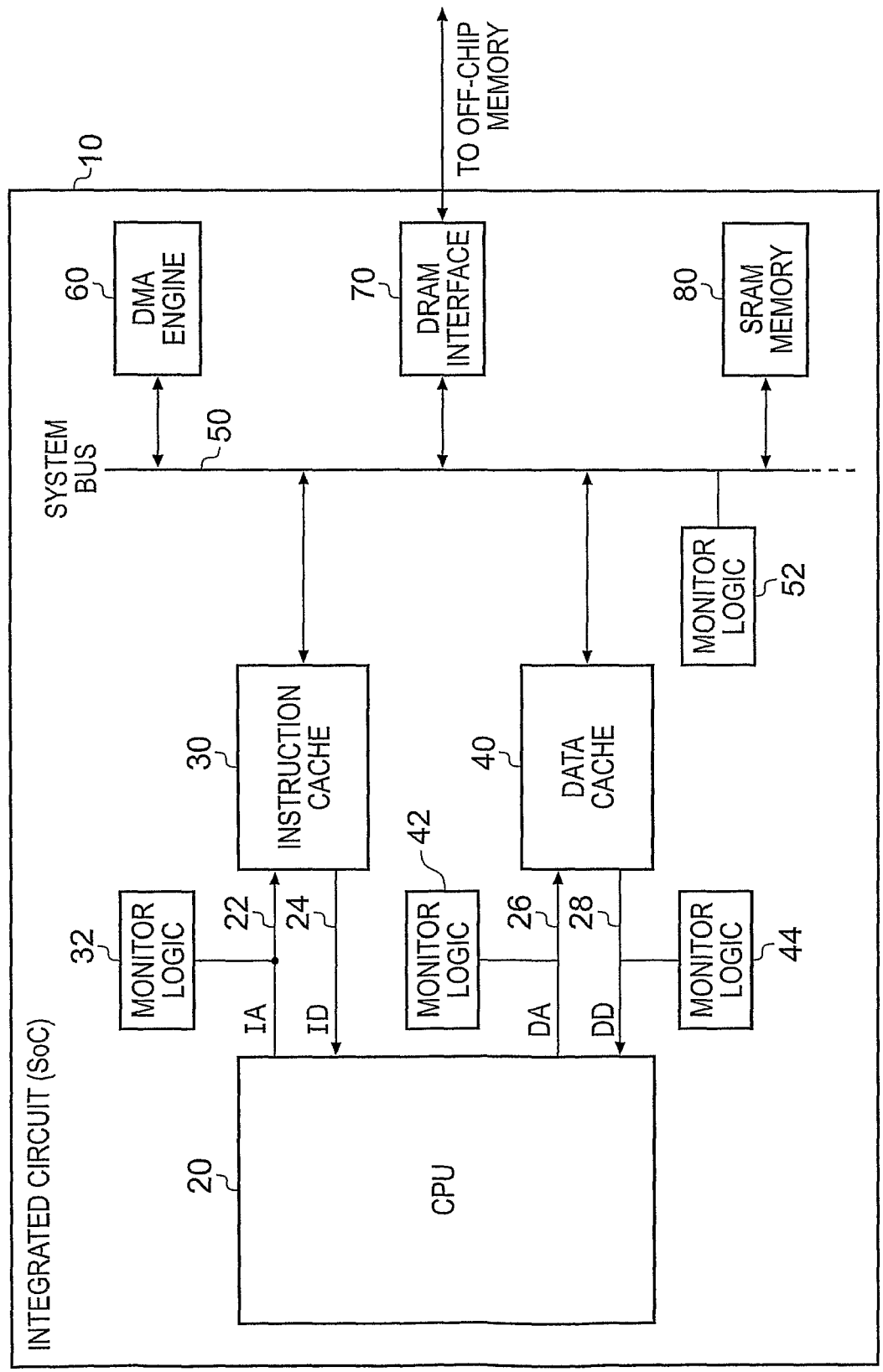
FIG. 1 is a block diagram of an integrated circuit including monitoring logic in accordance with one embodiment.

FIG. 1 illustrates an integrated circuit in the form of a System on Chip (SoC), which incorporates monitoring logic in accordance with one embodiment. In accordance with the example illustrated in FIG. 1, the SoC 10 includes a central processing unit (CPU) 20 having an associated instruction cache 30 and a data cache 40. The CPU 20 will typically include a prefetch unit for prefetching instructions for execution by a processing pipeline within the CPU, with an instruction to be prefetched being identified by an instruction address output on path 22 to the instruction cache 30. In the event of a hit in the instruction cache 30, the required instruction is returned to the CPU 20 over path 24. In the event of a cache miss, a linefill process is performed to retrieve a cache line's worth of instruction data into the instruction cache 30 from memory, for example off-chip memory accessed via the system bus 50 and DRAM (Dynamic RAM) interface 70, or on-chip memory such as the SRAM (Static RAM) memory 80 connected to the system bus 50.

When instructions are executed within the CPU 20, a load/store unit (LSU) will typically be used to load data from memory into the working registers of the CPU, or alternatively store data from the working registers back to memory. Any such read or write access will involve the issuance of a data address over path 26 to the data cache 40. In the event of a store operation, the corresponding data value will also be output over path 28 to the data cache 40. In the event of a hit in the data cache, then the data access will proceed. For a store operation, this will typically involve writing the data value into the data cache, whereas for a read operation this will involve returning the required data over path 28 to the CPU 20. In the event of a cache miss, a linefill procedure is again performed to retrieve a cache line's worth of data into the data cache 40, whereafter the access can proceed. This linefill process will involve the issuance of an access request on to the system bus 50, where the data the subject of the linefill will be accessed in either external memory via the DRAM interface 70, or from on-chip memory, for example the SRAM memory 80.

In accordance with embodiments, monitoring logic can be provided at one or more locations within the SoC 10 to monitor the values of one or more signals of interest. The monitoring logic will be configured to seek to detect the occurrence of particular values within a set of values to be monitored, and to output a trigger signal when such a value is perceived to have been detected, with that trigger signal being used to trigger a further monitoring process.

As illustrated in FIG. 1, the monitoring logic may be located at a variety of places within the integrated circuit, and indeed more than one piece of monitoring logic may be provided. Hence, by way of example, monitoring logic 32 may be connected to the instruction address path 22 to monitor the occurrence of particular instruction addresses, monitoring logic 42 may be connected to the data address path 26 to monitor the occurrence of certain data addresses, monitoring logic 44 may be connected to the path 28 to monitor the occurrence of certain data values, and monitoring logic 52 may be connected to the system bus 50 to monitor the occurrence of certain values appearing on that system bus, for example values of signals issued by the Direct Memory Access (DMA) engine 60, or the CPU 20 via its caches 30, 40, etc. Such signals may include, in addition to the above mentioned instruction address, data address and data value signals, signals representing register numbers, interrupt identifiers, out of band data on a bus (which might, for example, identify the transaction initiator), input/output (I/O), contents and headers of data and control packets (e.g. used in a Network on Chip (NoC)), etc.

Figure 2:
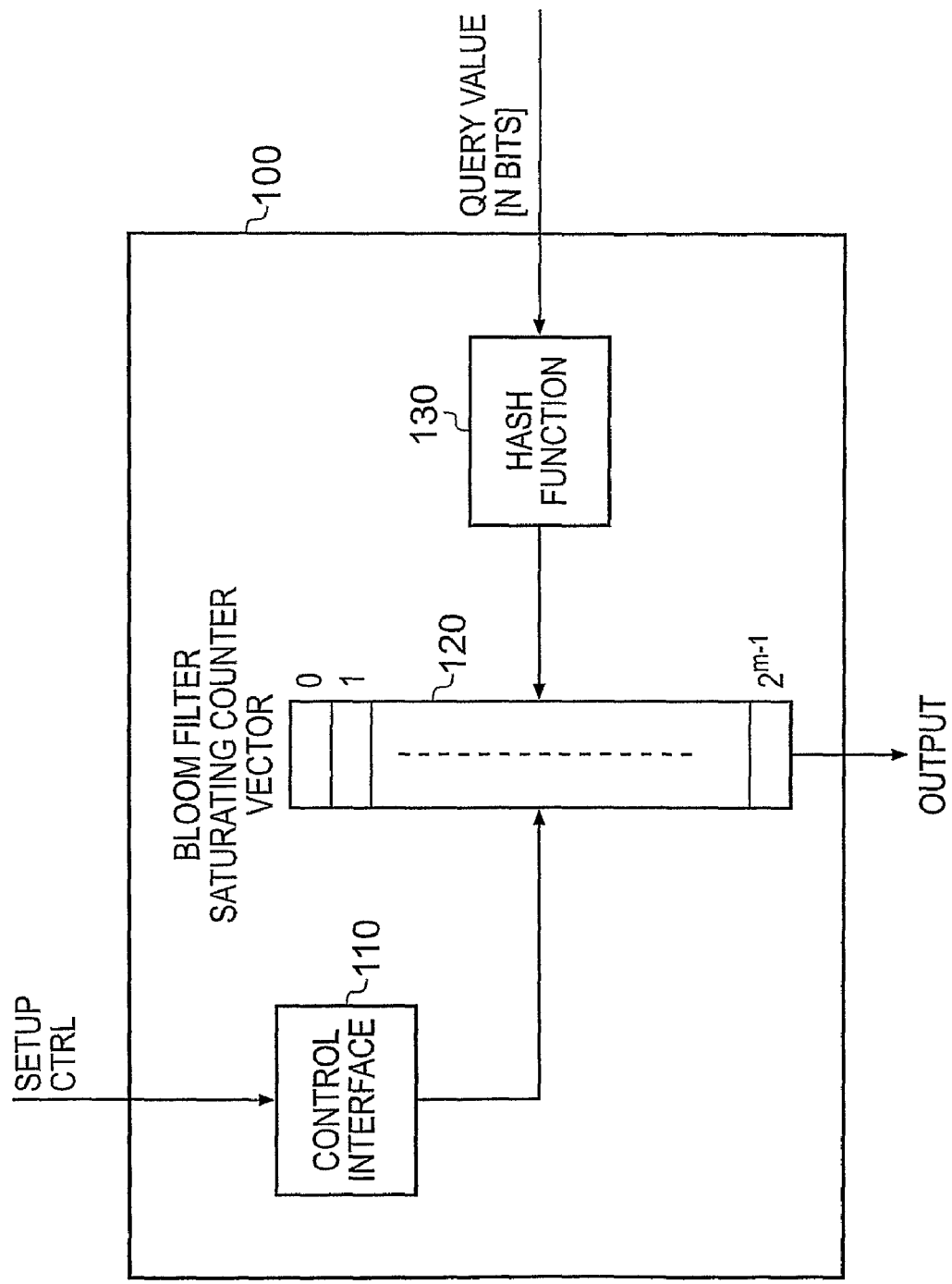
FIG. 2 is a diagram illustrating in more detail the monitoring logic of FIG. 1 in accordance with one embodiment.

In accordance with embodiments, each piece of monitoring logic 32, 42, 44, 52 can be implemented in the same manner, and FIG. 2 is a block diagram schematically illustrating such monitoring logic in accordance with one embodiment. In particular, the monitoring logic 100 of FIG. 2 incorporates a Bloom filter saturating counter vector 120 containing "m" counter values.

Bloom Filters were named after Burton Bloom for his seminal paper entitled "Space/Time Trade-Offs in Hash Coding with Allowable Errors", Communications of the ACM, Volume 13, Issue 4, July 1970. The purpose was to build memory efficient database applications. Bloom filters have found numerous uses in networking and database applications in the following articles:

A. Border and M. Mitzenmacher, "Network application of Bloom Filters: A Survey", in 40th Annual Allerton Conference on Communication, Control, and Computing, 2002;

S. Rhea and J. Kubiatowicz, "Probabilistic Location and Routing", IEEE INFOCOM'02, June 2002;

S. Dharmapurikar, P. Krishnamurthy, T. Sproull and J. Lockwood, "Deep Packet Inspection using Parallel Bloom Filters", IEEE Hot Interconnects 12, Stanford, Calif., August 2003;

A. Kumar, J. Xu, J. Wang, O. Spatschek, L. Li, "Space-Code Bloom Filter for Efficient Per-Flow Traffic Measurement", Proc. IEEE INFOCOM, 2004;

F. Chang, W. Feng and K. Li, "Approximate Caches for Packet Classification", IEEE INFOCOM'04, March 2004;

S. Cohen and Y. Matias, "Spectral Bloom Filters", Proceedings of the 2003 ACM SIGMOD International Conference on Management of Data, 2003; and L. Fan, P. Cao, J. Almeida, and A. Broder, "Summary cache: A scalable wide-area Web cache sharing protocol," IEEE/ACM Transactions on Networking, vol. 8, no. 3, pp. 281-293, 2000.

Bloom Filters have been used for network routing in the following article: S. Dharamapurikar, et al., Longest Prefix Matching using Bloom Filters, in Proceedings of the ACM SIGCOMM 2003 Conference on Applications, Technologies, Architectures, and Protocols for Computer Communication, Aug. 25-29, 2003, Karlsruhe, Germany. ACM 2003. This paper tackles the "Longest Prefix Match" problem used to make packet forwarding decisions in network routers. It aims to solve the problem using one hash table per prefix length to store forwarding information for each prefix length. One Bloom filter per hash table is used to "guard" the hash table: there is no need to lookup a prefix in the hash table if the prefix is not present in the Bloom filter.

Recently, Bloom filters have been used in the field of computer micro-architecture. Sethumadhvan et al in the article "Scalable Hardware Memory Disambiguation for High ILP Processors", Proceedings of the 36th International Symposium for Microarchitecture pp. 399-410, 2003, uses Bloom Filters for memory disambiguation to improve the scalability for load store queues. Roth in the article "Store Vulnerability Window (SVW): Re-Execution Filtering for Enhanced Load Optimization", Proceedings of the $32^{nd}$ International Symposium on Computer Architecture (ISCA-05), June 2005, uses a Bloom filter to reduce the number of load re-executions for load/store queue optimizations. Akkary et al in the article "Checkpoint Processing and Recovery: Towards Scalable Large Instruction Window Processors", Proceedings of the 36th International Symposium for Microarchitecture, December, 2003, also uses a Bloom filter to detect the load-store conflicts in the store queue. Moshovos et al in the article "JETTY: Snoop filtering for reduced power in SMP servers", Proceedings of International Symposium on High Performance Computer Architecture (HPCA-7), January 2001, uses a Bloom filter to filter out cache coherence requests or snoops in SMP systems.

For a generic Bloom filter, a given value in N bits is hashed into k hash values using k different random hash functions. The output of each hash function is an m-bit index value that addresses a Bloom filter saturating counter vector of $2^m$ elements. Here, m is typically much smaller than N.

Each element of the Bloom filter saturating counter vector contains a counter value which will initially be zero. To populate the Bloom filter saturating counter vector, each value within a set of values of interest is passed through a hash function to generate one or more indexes, with each index identifying one of the saturating counters in the vector. Each identified counter is then incremented. In one particular example, the Bloom filter saturating counter vector is actually a bit vector, with each element of the vector containing a single bit. Initially, each bit is zero, and as soon as an index generated from one of the values of interest identifies a particular element, that element is set to a logic one value.

In one embodiment, the saturating counter vector 120 within the monitoring logic 100 is programmed by software having knowledge of the hash function 130 that will be applied by the monitoring logic. Typically, this software will be associated with the logic that is to make use of the triggers generated by the monitoring logic. Hence, for example, a debug application may program a particular saturating counter vector 120 into the monitoring logic 100 based on a knowledge of the hash function 130 to be applied by that monitoring logic. Indeed, in some embodiments, the hash function itself may be software programmable.

As another example, software associated with a trace analysing tool or a profiling tool may program a particular saturating counter vector into the monitoring logic 100 so as to program which values will cause trigger signals to be generated to trigger further trace or profiling processes.

As shown in FIG. 2, a control interface 110 is provided via which the monitoring logic 100 can receive a particular saturating counter vector from the appropriate software.

Figure 3:
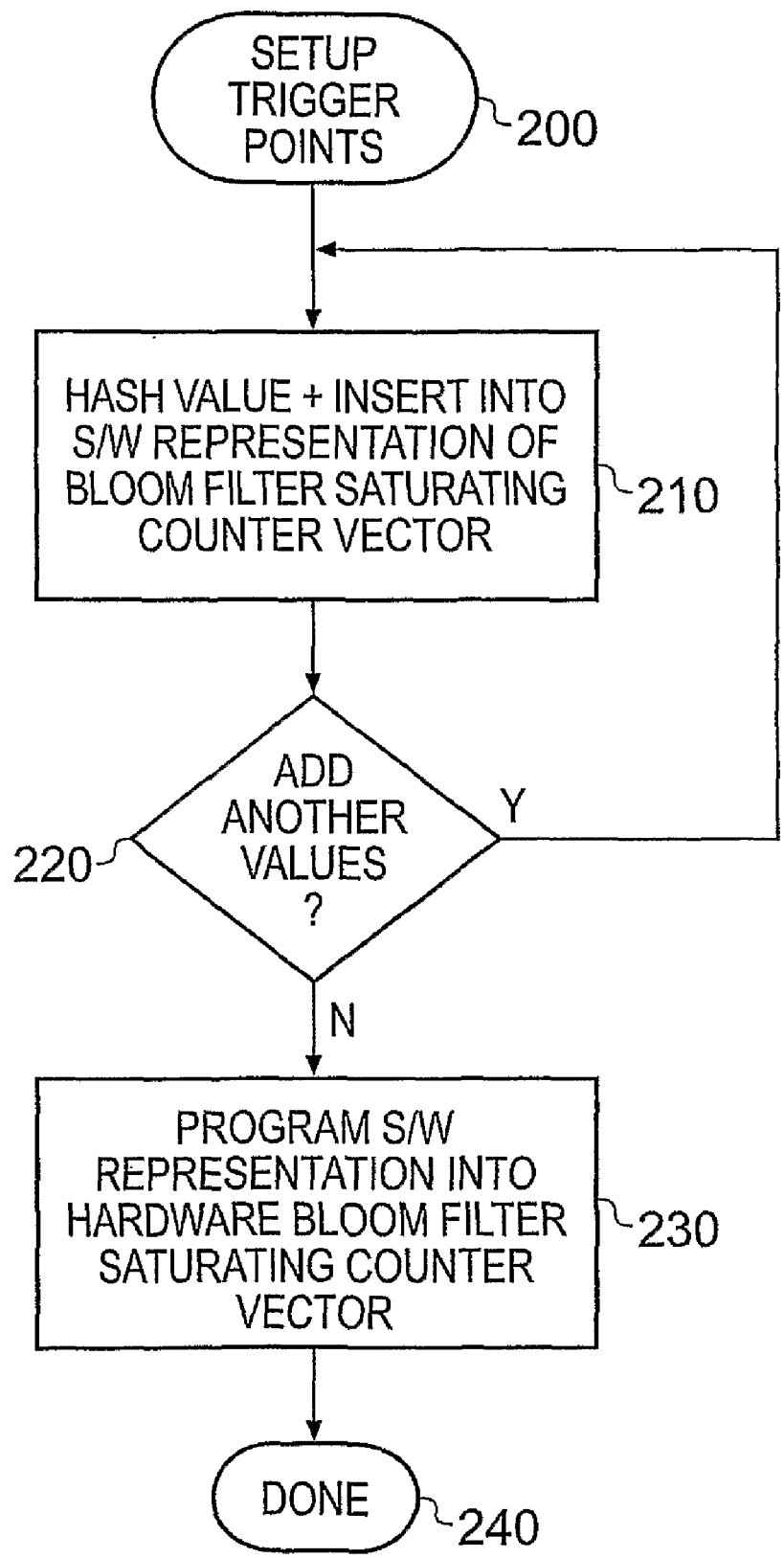
FIG. 3 is a flow diagram illustrating a process performed by software in one embodiment in order to set up trigger points to be monitored by the monitoring logic of FIG. 1.

The software process used to produce a particular saturating counter vector to represent a set of trigger points, i.e. a set of values of interest for which the monitoring logic 100 should issue trigger signals, will be described below with reference to FIG. 3. As shown at step 200, the process starts, whereafter a first value in the set is subjected to the appropriate hash function to generate one or more indexes identifying corresponding elements in a software representation of the Bloom filter saturating counter vector. For a bit vector, this will cause each indexed element to be set, whilst for a saturating counter vector it will cause each indexed element to have its value incremented unless it is already at a maximum count value. By such an approach, the value of interest can be considered to have been inserted into the software representation of the Bloom filter saturating counter vector.

At step 220, it is determined whether there are any other values to be added as trigger points into the Bloom filter, and if so step 210 is repeated for the next value. When at step 220 it is determined that no other values are to be added, then the software representation of the vector can be programmed into the hardware Bloom filter saturating counter vector 120 at step 230 by the software issuing appropriate signals to the control interface 110 of the monitoring logic 100. Thereafter, at step 240, the process is complete.

In an alternative embodiment, rather than the software constructing the Bloom filter saturating counter vector itself, it can issue control commands to the control interface 110 to cause the monitoring logic 100 itself to maintain the Bloom filter saturating counter vector. As an example, the counter interface 110 may be arranged to receive add, remove and reset commands. The add command would identify a new value to be incorporated into the saturating counter vector, whereas a remove command would identify a value to be removed from the saturating counter vector. Likewise, a reset command could cause the saturating counter vector to be reset to a default value. In such instances, the monitoring logic 100 would comprise logic for modifying the saturating counter vector 120, using the hash function 130 to generate the required index or indexes into the saturating counter vector based on the value to be added or removed. The process performed can be considered to be conceptually similar to that described earlier with reference to step 210 of FIG. 3, but is hardware implemented within the monitoring logic 100 itself. Such an approach may be useful in situations where the software issuing the update commands does not have direct knowledge of the hash function used within the monitoring logic 100, and accordingly cannot directly produce the replacement saturating counter vector.

Once the monitoring logic 100 has been set up using the above described process, then each time a value is seen over the path to which that monitoring logic is connected, that value can be passed through the hash function 130 in order to generate one or more indexes into the saturating counter vector 120. In one particular embodiment, the hash function 130 generates a single index and accordingly one element of the saturating counter vector is identified. If that entry has a logic zero value in it, then this means that the value is definitely not within the set of values of interest. If instead this entry has a non-zero value, then this indicates that the value may be within the set of values of interest, but this cannot be guaranteed. In the more general case where the hash function 130 produces more than one index, then if at least one of the counters accessed by those indexes has a logic zero value, this indicates that the value is not within the set of values of interest, whereas if all of the entries accessed by the various indices have values that are non-zero then this indicates that the value may be within the set of values of interest.

Figure 4:
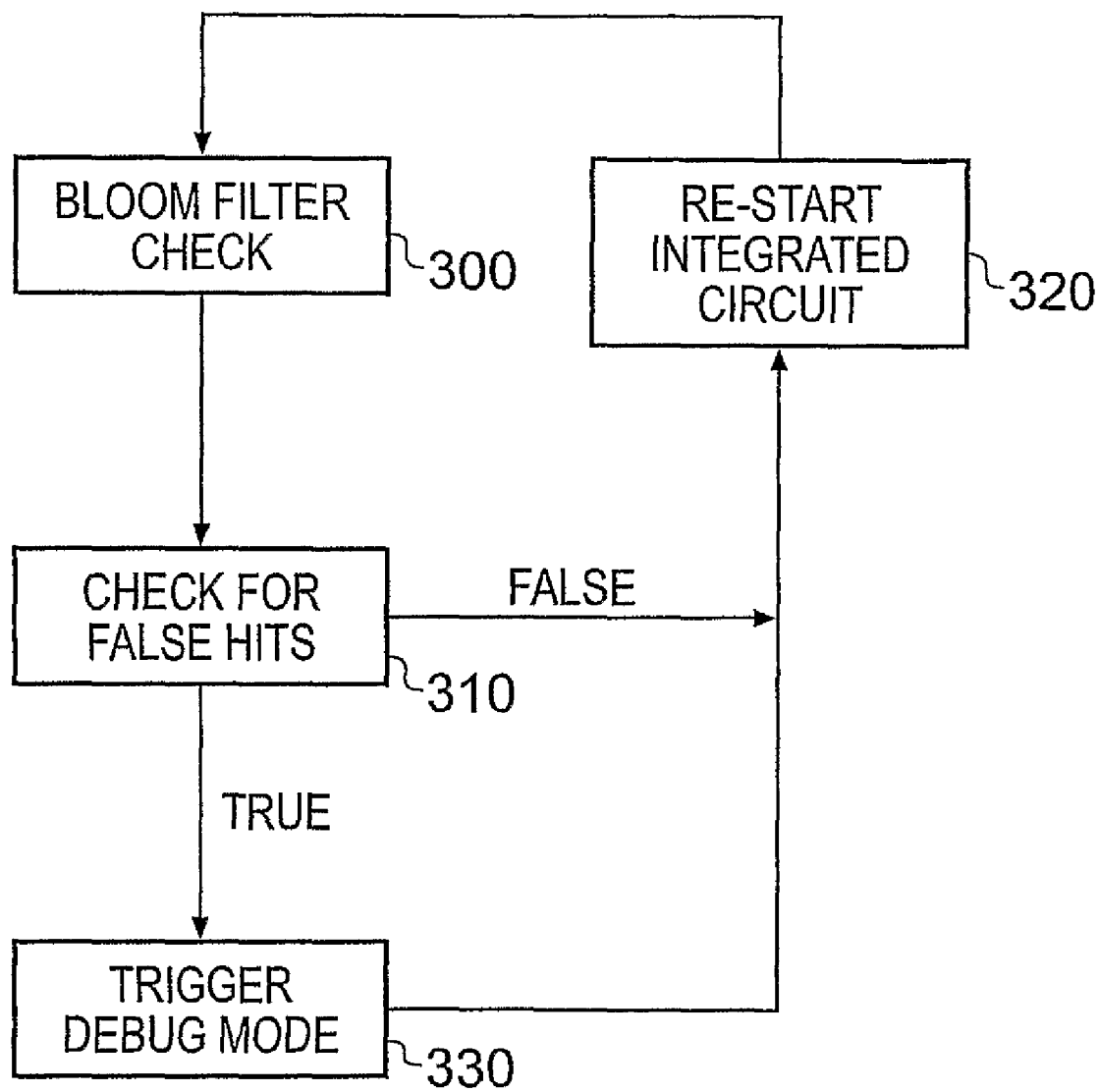
FIG. 4 is a flow diagram illustrating the use of the monitoring logic of FIG. 1 in association with a debug application.
Figure 6:
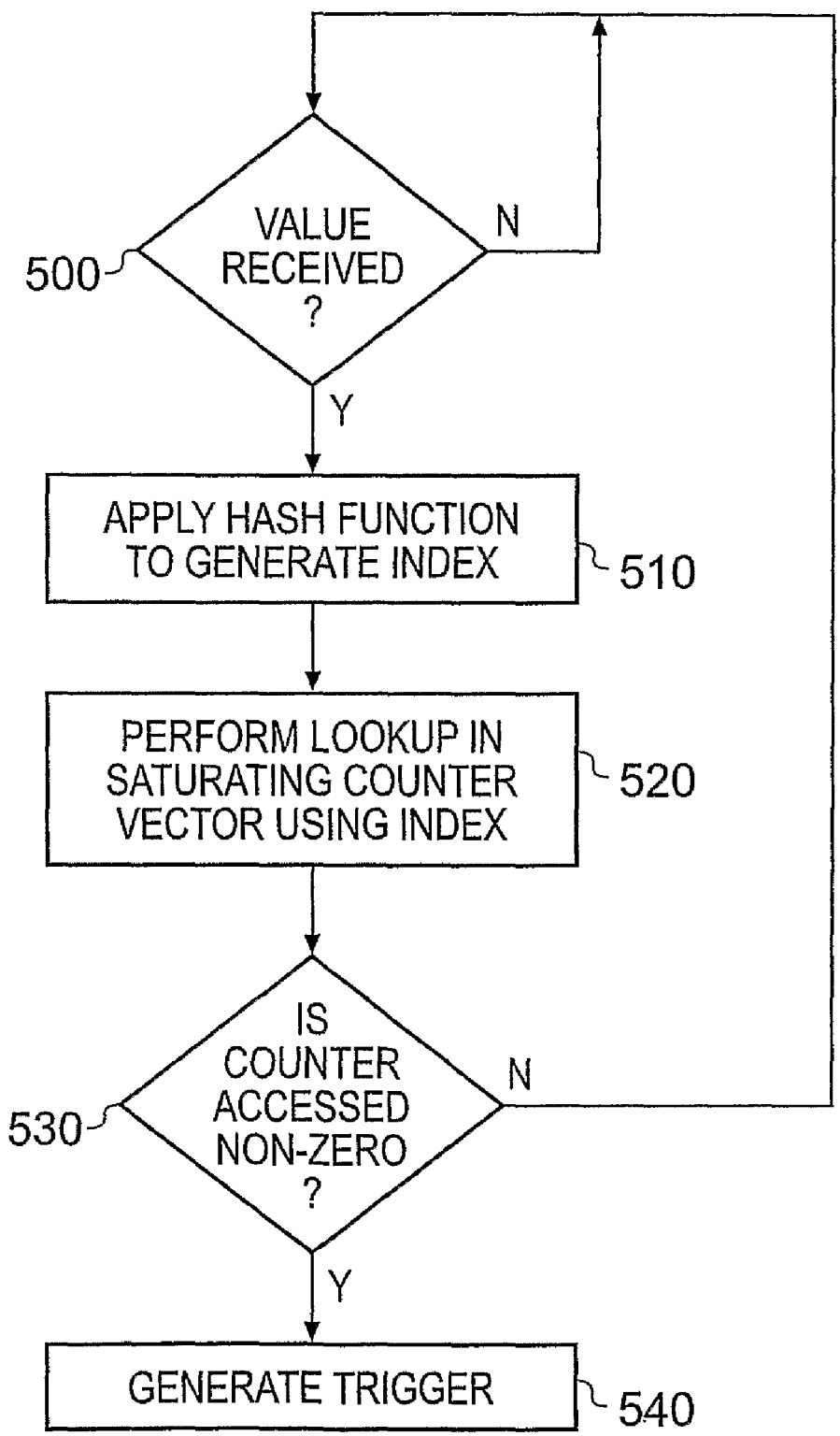
FIG. 6 is a flow diagram illustrating the steps performed to implement the Bloom filter check operation of FIG. 4 or 5, in accordance with one embodiment.

As mentioned earlier, the Bloom-filter based monitoring logic of embodiments can be controlled by a variety of applications in order to control when those monitoring logic units generate trigger signals for invoking further monitoring processes of those applications. FIG. 4 is a general flow diagram illustrating the sequence of steps that may be performed when the monitoring logic units are associated with a debug application. At step 300, a value to be checked, i.e. the value of a particular signal that the monitoring logic has been arranged to monitor, is subjected to a Bloom filter checking process at step 300. This process is shown in more detail in FIG. 6. As shown in FIG. 6, at step 500, it is determined whether a value to be checked has been received by the monitoring logic 100. If not, then no action is required, but if a value is received, then the hash function 130 is applied at step 510 in order to generate an index. As mentioned earlier, in one embodiment, the hash function 130 generates a single index, and it is assumed that such an embodiment is being used here.

Thereafter at step 520, a look up is performed in the saturating counter vector using the index generated at step 510. Thereafter, it is determined at step 530 whether the counter accessed as a result of that look up procedure has a non-zero value. If not, no action is required, since in this instance it can be guaranteed that the value being reviewed is definitely not a value within the set of values to be monitored. However, if at step 530 it is determined that the counter has a non-zero value, then a trigger signal is generated at step 540.

If multiple indices have been generated at step 510, then at step 530 it will be necessary to determine whether all counters accessed had a non-zero value. If any counter had a zero value, then the "no" branch can be taken from step 530, and only if all counters accessed by the indices have non-zero values is the trigger signal generated at step 540.

In one particular embodiment, as mentioned earlier, the saturating counter vector is a bit vector, and each counter is a single bit value.

Returning to FIG. 4, once the Bloom filter check process has been performed at step 300, then assuming a trigger signal is generated the trigger signal is used to initiate a further checking operation at step 310 to check for any false hits. This process may for example be performed in software, and may for example be arranged to perform a direct comparison of the value that caused the trigger signal to be generated, with the values in the set of values to be monitored. In one embodiment, the software required to perform this checking operation will reside on the host computer on which the debug application is run, and will be arranged to execute in response to the trigger signal prior to entering the full debug mode of the debug application.

When the trigger signal is issued by the monitoring logic at step 300, then typically the integrated circuit will then stall pending the outcome of the debug analysis. However, if as a result of the preliminary check performed at step 310, it is determined that the trigger signal was due to a false hit within the Bloom filter, then the process branches straight to step 320, where the integrated circuit is restarted.

If however at step 310 it is determined that there was no false hit, then the process proceeds to step 330, where the full debug mode is entered to allow whatever debug process is required given the occurrence of a value within the set of values being monitored. Thereafter, the process returns to step 320, where the integrated circuit is restarted.

From the above discussion, it will be seen that the Bloom filter check at step 300 provides a quick check to determine whether a value definitely is not a value within a set of values of interest, or alternatively whether it may be a value within a set of values of interest. If it may be a value within a set of values of interest, then control is passed over to the debug application, where a further check is performed to identify any false hits. In the event of a false hit, the integrated circuit can be restarted without any further delay, and only in the situation where the hit has correctly identified one of the values of interest is the full debug mode entered.

Figure 5:
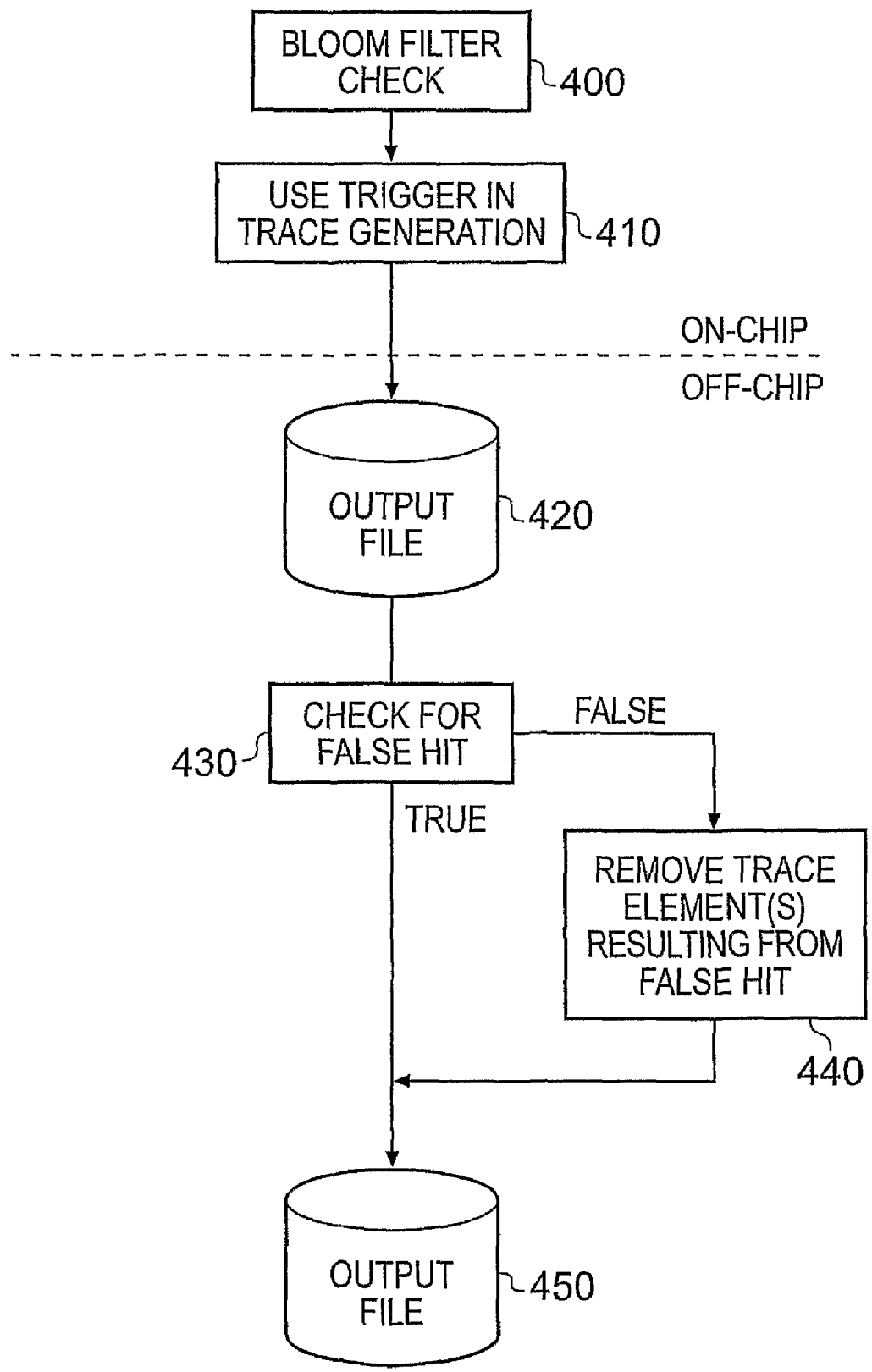
FIG. 5 is a flow diagram illustrating the use of the monitoring logic of FIG. 1 in association with a trace application.

FIG. 5 is a flow diagram illustrating the use of the monitoring logic in association with trace logic used to generate a stream of trace elements indicative of particular activities of the integrated circuit. The trace logic may be closely integrated with the CPU 20, for example to monitor activities over particular paths between the CPU 20 and its instruction or data caches 30, 40, or alternatively may be bus trace logic associated with the system bus 50 to monitor activities occurring over that system bus. In either case, when a value is received by the relevant monitoring logic, then a Bloom filter check is performed at step 400, using the earlier described process of FIG. 6. If this results in the generation of a trigger, then at step 410, that trigger is used by trace generation logic within the trace logic. Hence, by way of example, the trigger signal may identify that a particular data address appears to have been encountered, this being a data address which the trace logic wants to generate one or more trace elements in respect of. The trace elements may for example trace that address, and/or may trace the data value associated with that address. Additionally, trace elements associated with one or more subsequent addresses may also be traced as a result of the trigger signal being received.

The stream of trace elements produced by the trace logic, which will include one or more trace elements produced as a result of the trigger signal received from the monitoring logic, will typically be output off-chip, where it is stored within an output file 420. Thereafter, in accordance with the embodiment illustrated in FIG. 5, a check can be performed by software at step 430 in order to identify whether the trigger signal was due to a false hit within the Bloom filter. This process is analogous to the step 310 described with reference to FIG. 4. The software used to perform this check can reside at any suitable location, but may for example reside on the host computer used to run a trace analysing tool. If a false hit is detected at step 430, then the process branches to step 440, where any trace elements resulting from that false hit are removed from the trace stream, whereafter the revised data is stored in the output file 450.

Alternatively, if at step 430 it is determined that there was no false hit, then no changes to the stream of trace elements stored in the output file are required, and the output file 450 corresponds to the output file 420. Thereafter, the trace analysing tool can be used to perform any required analysis based on the stream of trace elements stored in the output file 450.

In some embodiments, it may be unnecessary to remove any trace elements resulting from a false hit, and instead the trace analysing tool is merely presented with the output file 420. Whilst this may contain certain trace elements which are not of interest to the trace analysing tool, this will not adversely impact the operation of the trace analysing tool.

The flow diagram of FIG. 5 can also be used to illustrate the use of the monitoring logic in association with profiling logic used to generate profiling information for routing to a profiling analysis tool. In this case, at step 410, the trigger would be used to generate the profiling information which is then stored in the output file 420. Step 440 could then be used to remove any profiling information generated as a result of a false hit. The profiling analysis tool would then access the output file 450 in order to review the profiling information.

Figure 7:
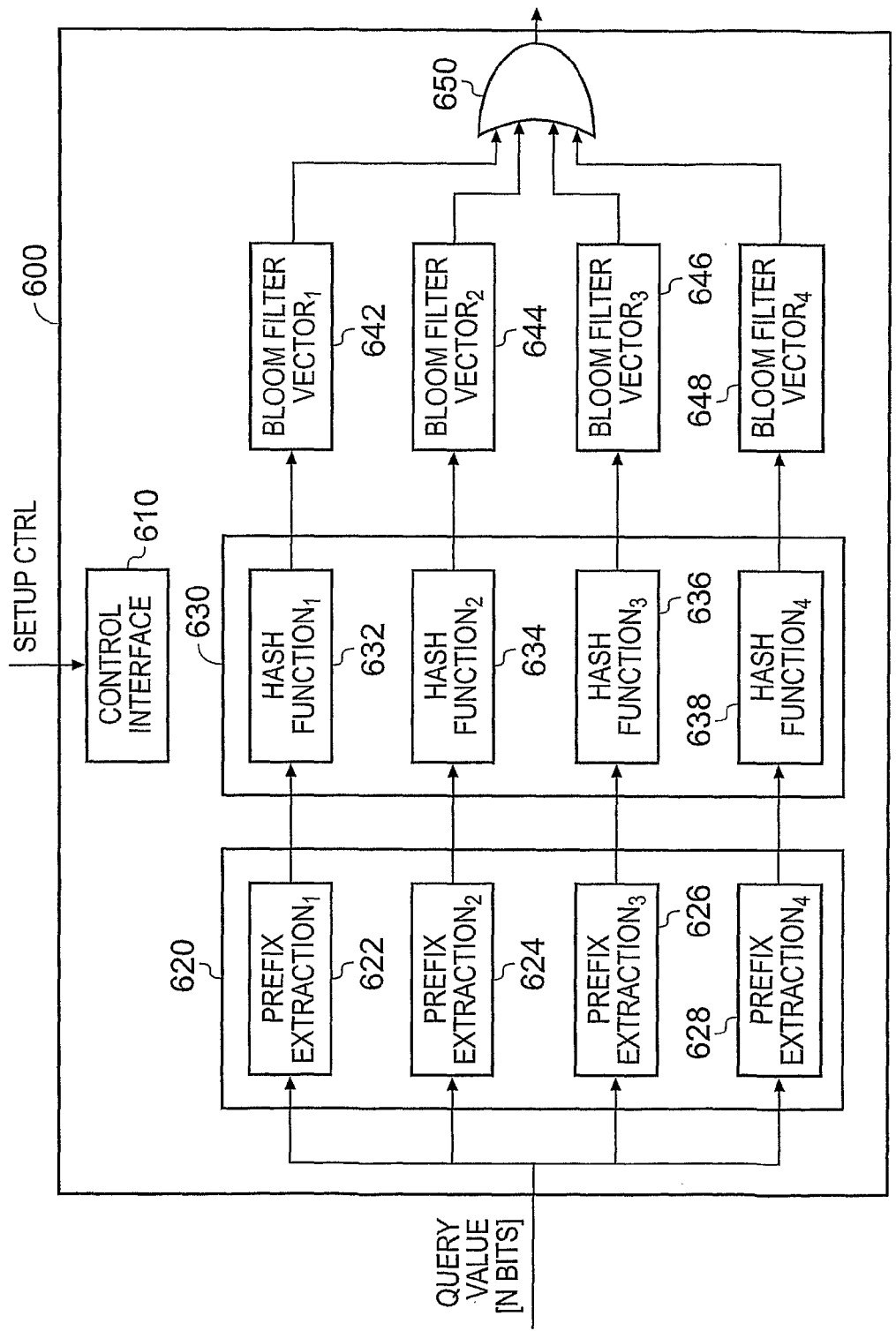
FIG. 7 is a block diagram illustrating the monitoring logic of FIG. 1 in accordance with an alternative embodiment.

In the above described embodiments, it has been assumed that the set of values of interest to be monitored comprise a set of discrete values. However, FIG. 7 illustrates an alternative embodiment of the monitoring logic which may be used to enable ranges of values to be monitored. In accordance with this embodiment, the monitoring logic 600 has a plurality of Bloom filter saturating counter vectors 642, 644, 646, 648, each of which are software programmable via the control interface 610, and each of which is associated with a particular prefix length. The prefix length identifies the number of most significant bits of the data value to be monitored that are extracted from the data value by prefix extraction units 622, 624, 626, 628 associated with the Bloom filter vectors 642, 644, 646, 648, respectively.

As can be seen from FIG. 7, prefix extraction logic 620 includes a prefix extraction unit for each Bloom filter vector. As an example of their operation, if the values to be monitored are 8 bits in length, and the Bloom filter vector 642 is associated with a prefix length of six, this means that the prefix extraction unit 622 will extract the most significant 6 bits of each value to be monitored, and will then pass those 6 bits to the hash function 632 within hash logic 630 in order to generate a corresponding index into the Bloom filter vector 642. Given the prefix length of six, it can be seen that the Bloom filter vector 642 is appropriate for storing ranges of four.

Each of the Bloom filter vectors 642, 644, 646, 648 will typically be associated with different prefix lengths, and accordingly different ranges, and the associated prefix extraction units 622, 624, 626, 628 will extract the relevant number of prefix bits appropriate for each Bloom filter vector. These extracted prefix bits will then be passed through associated hash functions 632, 634, 636, 638 within the hash logic 630 in order to produce one or more indexes into each Bloom filter vector.

In one embodiment, a single index is produced by each hash function, and each Bloom filter vector is a bit vector with each element of the vector storing either a logic zero value or a logic one value. The value stored in the element of each Bloom filter vector referenced by the index produced by the associated hash function will then be output to the OR gate 650.

Accordingly, for a particular received query value, it can be seen that if each entry accessed in the plurality of Bloom filter vectors 642, 644, 646, 648 is at a logic zero value, this will indicate that the query value is not within a range of values of interest, and accordingly no trigger signal will be generated. However, if any entry accessed in any of the Bloom filter vectors 642, 644, 646, 648 is non-zero, then this will cause a logic one value to be output by the OR gate 650, and accordingly the trigger signal will be generated.

A range of values can be inserted into the Bloom filters of such an embodiment by splitting a range into a number of subranges, where each subrange consists of all values having the same prefix length. For example, given prefix lengths of 7, 6, 5 and 4 bits, a range of 0.5 could be represented by using either two separate entries for prefix lengths 6 and 7, or a single entry for prefix length 5. The first uses two entries and covers the range exactly, while the second uses a single entry but over-approximates the range. This flexibility enables different configuration policies to be used dependent on the number and size of ranges to be monitored. The false hit rate of a Bloom filter is determined by how many entries in the saturating counting vector are non-zero and by the distribution of values being looked up. By choosing different representations for the same set of ranges, a balance can be achieved between the rate of false hits which are due to having too many entries in an individual Bloom filter and the rate of false hits which are due to over-approximation.

Accordingly, it will be seen that when the monitoring logic takes the form discussed above with reference to FIG. 7, then it is possible to monitor the occurrence of values within one or more ranges of values of interest, rather than merely monitoring whether a value is encountered that exists within a set of discrete values of interest. It is also possible to monitor a range of values using a single Bloom filter (e.g. using the embodiment in FIG. 2) by individually inserting each element in the range but, if the range is very large, then most entries in the saturating counter vector 120 will be non-zero leading to a high rate of false hits. Thus, the advantage of the embodiment in FIG. 7 is that a very large range can be represented by just a few Bloom filter entries leading to a low false hit rate.

The prefix lengths associated with each Bloom filter vector 642, 644, 646, 648 may be predetermined, but in one embodiment these prefix lengths are also software programmable via the control interface 610.

FIG. 7 is similar in some respects to FIG. 1 in the earlier-mentioned paper "Longest Prefix Matching using Bloom Filters", in that it uses an array of prefix extraction units in front of an array of Bloom filters. However, the technique in that paper is concerned with finding packet forwarding information associated with the longest prefix match, whereas the technique described with reference to FIG. 7 of the present application is concerned with determining whether a value matches ranges of values. This leads to a number of differences, including:

1) The article uses Bloom filters for processing data (i.e. packet forwarding) rather than in monitoring the processing of data.
2) Since the article already uses one hash table per prefix, it simply describes using each Bloom filter as a 'guard' for the corresponding hash table.
3) Since in the embodiment of FIG. 7 described earlier it is only desired to know if the value is in one or more ranges of values of interest, all the results of the Bloom filter lookups are ORed together. In contrast, the article uses a priority encoder to construct an ordered list of all possible matches.

Another difference between the embodiment of FIG. 7 and the "Longest Prefix Matching using Bloom Filters" paper is as follows. Whilst the technique described in that paper extracts multiple prefixes from a value of interest and looks those prefixes up in a number of Bloom filters, the technique differs from that described above with reference to FIG. 7 in that, in network routing applications to which the paper refers, each prefix length that matches may be associated with different packet routing information and one must always use the information for the most precise (i.e., longest) match. In contrast, in the technique described earlier with reference to FIG. 7, multiple Bloom filters are used as a way of reducing the false hit rate of the monitoring logic by allowing the insertion of too many entries in any individual Bloom filter to be avoided.

From the above description of embodiments, it can be seen that the above described techniques present a number of advantages over known watchpoint designs. In particular, existing watchpoint designs are limited by the watchpoint resource provided in hardware, meaning that there is a finite number of entries which must be shared by all processes running on a processor. However, the embodiments remove this restriction, by in effect enabling an unlimited number of trigger points to be monitored.

The Bloom filter vectors employed in embodiments are software programmable, providing significant flexibility in the way in which they are set up. In one embodiment; the values to be monitored can include a reference to a process identifier indicating the process with which the value is associated, which provides additional flexibility in how the trigger signal is generated.

Use of the techniques of embodiments provides a quick mechanism for eliminating the majority of the overhead in detecting the occurrence of values within a set of values of interest, with any values that are within that set always being detected. Whilst the mechanism will give a certain degree of false hits, the level of false hits can be managed through appropriate selection of the size of the Bloom filter vectors, and the number of values in the set to be monitored.

The techniques described can be used in a variety of applications, for example debug applications, trace applications, profiling applications, etc.

Furthermore, the monitoring logic has the flexibility that it can be used either alone, or in combination with other known monitoring techniques, for example standard hardware watchpoint mechanisms, MMU-based mechanisms, etc.

Although non-limiting example embodiments have been described herein, it will be appreciated that the claims are not limited thereto and that many modifications and additions thereto may be made.

The invention claimed is:

1. An integrated circuit comprising:
processing logic configured to execute a program;
watchpoint monitoring logic configured to review values of one or more signals occurring within the integrated circuit as a result of execution of said program, the watchpoint monitoring logic comprising:
a storage element for storing configuration data;
an interface via which the configuration data is software programmable having regard to a set of watchpoint values of said one or more signals to be monitored; and
hash logic configured for a value to be reviewed to perform a hash operation on that reviewed value in order to reference the configuration data to determine whether that reviewed value is either definitely not a value within said set of watchpoint values or is potentially a value within said set of watchpoint values;
the watchpoint monitoring logic being configured to generate a trigger signal if it is determined that that reviewed value is potentially a value within said set of watchpoint values, the trigger signal being used to trigger a further monitoring process, wherein the trigger signal is used to trigger as at least part of said further monitoring process a checking operation to determine whether the reviewed value causing the trigger signal to be generated is a value within said set of watchpoint values; and
if a number of watchpoint values in said set of watchpoint values is increased, the configuration data being reprogrammed via the interface without increasing the size of the storage element.

2. An integrated circuit as claimed in claim 1, wherein the watchpoint monitoring logic implements a Bloom filter operation, the configuration data in the storage element comprises a Bloom filter saturating counter vector, and the hash logic is configured from the value to be reviewed to generate at least one index, each index identifying a saturating counter in the Bloom filter saturating counter vector, and wherein the watchpoint monitoring logic is configured to generate the trigger signal if each saturating counter identified by the at least one index contains a non-zero value.

3. An integrated circuit as claimed in claim 2, wherein the Bloom filter saturating counter vector is a Bloom filter bit vector, such that each saturating counter comprises a single bit.

4. An integrated circuit as claimed in claim 1, wherein the set of watchpoint values to be monitored specify at least one range of watchpoint values, and the watchpoint monitoring logic comprises:
a plurality of storage elements, each associated with a particular prefix length and configured to store configuration data for reference based on a prefix value having that particular prefix length;
prefix extraction logic configured for a value to be reviewed to extract a plurality of prefix values, each prefix value being of a prefix length appropriate for referencing one of said plurality of storage elements;
the hash logic being configured, for each prefix value, to perform an associated hash operation in order to reference the configuration data in the corresponding storage element to cause an output signal to be produced from the corresponding storage element;
combination logic configured based on the output signals received from each storage element to determine whether the value to be reviewed is either definitely not within said at least one range of watchpoint values, or is potentially a value within said at least one range of watchpoint values;

the watchpoint monitoring logic being configured to generate said trigger signal if it is determined that that reviewed value is potentially a value within said at least one range of watchpoint values.

5. An integrated circuit as claimed in claim 4, wherein the particular prefix lengths with which the storage elements are associated are software programmable.

6. An integrated circuit as claimed in claim 1, wherein if software having knowledge of the hash operation performed by the hash logic alters said set of watchpoint values, the interface is configured to receive replacement configuration data to be stored in the storage element.

7. An integrated circuit as claimed in claim 1, wherein if software alters said set of watchpoint values, the interface is configured to receive an indication of the alteration to the set of watchpoint values, the watchpoint monitoring logic further comprising configuration data generating logic configured to generate replacement configuration data to be stored in the storage element.

8. An integrated circuit as claimed in claim 1, wherein if the watchpoint monitoring logic determines that that value to be reviewed is potentially a value within said set of watchpoint values, the watchpoint monitoring logic is configured to defer generation of said trigger signal until a predetermined event occurs.

9. An integrated circuit as claimed in claim 1, wherein said watchpoint monitoring logic is associated with debug logic, and the trigger signal is used to trigger as at least part of said further monitoring process a debug operation if said checking operation determines that the reviewed value causing the trigger signal to be generated is a value within said set of watchpoint values.

10. An integrated circuit as claimed in claim 1, wherein said watchpoint monitoring logic is associated with trace logic used to produce a stream of trace elements indicating activities of the integrated circuit, and the trigger signal is used to trigger as at least part of said further monitoring process a trace generation process to generate one or more trace elements to be included in said stream.

11. An integrated circuit as claimed in claim 1, wherein said watchpoint monitoring logic is associated with profiling logic used to profile behaviour of the integrated circuit, and the trigger signal is used to trigger as at least part of said further monitoring process a profiling process to update profiling information based on the trigger signal.

12. An integrated circuit as claimed in claim 1, wherein said one or more signals whose values are reviewed by the watchpoint monitoring logic comprise at least one of signals representing instructions or data, signals providing addresses of instructions or data, or signals providing out of band data on a bus.

13. An integrated circuit as claimed in claim 1, wherein the processing logic is configured when executing the program to run a plurality of processes, and each value reviewed by the watchpoint monitoring logic includes a process identifier indicating the process with which the reviewed value is associated.

14. An integrated circuit as claimed in claim 1, wherein the watchpoint monitoring logic is further configured to reference trigger generation criteria, such that the watchpoint monitoring logic is configured to generate the trigger signal if it is determined that the value is potentially a value within said set of watchpoint values and the trigger generation criteria is met.

15. An integrated circuit as claimed in claim 1, wherein the values reviewed by the watchpoint monitoring logic are a modified or filtered variant of original values of signals produced within the integrated circuit.

16. A data processing system comprising:
an integrated circuit as claimed in claim 1; and
analysis logic configured to perform the further monitoring process.

17. A data processing system as claimed in claim 16, wherein said analysis logic comprises debug logic, and the debug logic is configured on receipt of the trigger signal to perform said checking operation, and if said checking operation determines that the value causing the trigger signal to be generated is a value within said set of watchpoint values, to then perform as at least part of said further monitoring process a debug process.

18. A data processing system as claimed in claim 16, wherein said analysis logic comprises trace logic used to produce a stream of trace elements indicating activities of the integrated circuit, the trace logic being configured on receipt of the trigger signal to perform as at least part of said further monitoring process a trace generation process to generate one or more trace elements to be included in said stream.

19. A data processing system as claimed in claim 18, wherein said trace generation process is performed prior to said checking operation.

20. A data processing system as claimed in claim 19, wherein said trace logic is provided within said integrated circuit.

21. A data processing system as claimed in claim 16, wherein said analysis logic comprises profiling logic used to profile behaviour of the integrated circuit, the profiling logic being configured on receipt of the trigger signal to perform as at least part of said further monitoring process a profiling process to update profiling information based on the trigger signal.

22. A method of reviewing values of one or more signals occurring within an integrated circuit as a result of execution of a program by processing logic of that integrated circuit, the method comprising:
storing configuration data in a storage element, the configuration data being software programmable having regard to a set of watchpoint values of said one or more signals to be monitored;
for a value to be reviewed, performing a hash operation on that reviewed value in order to reference the configuration data to determine whether that reviewed value is either definitely not a value within said set of watchpoint values or is potentially a value within said set of watchpoint values;
using a trigger signal to trigger a further monitoring process if it is determined that that reviewed value is potentially a value within said set of watchpoint values;
performing as at least part of said further monitoring process a checking operation to determine whether the reviewed value causing the trigger signal to be generated is a value within said set of watchpoint values; and
if a number of watchpoint values in said set of watchpoint values is increased, reprogramming the configuration data in the storage element without increasing the size of the storage element.

* * * * *